United States Patent [19]

Jesse

[11] 4,148,057

[45] Apr. 3, 1979

[54] DIRECT LASER PRINTING AND FORMING APPARATUS

[75] Inventor: William L. M. Jesse, Upper Darby, Pa.

[73] Assignee: Solution Sciences, Inc., Upper Darby, Pa.

[21] Appl. No.: 845,007

[22] Filed: Oct. 25, 1977

[51] Int. Cl.[2] .......... H04N 5/76

[52] U.S. Cl. .......... 358/4; 346/76 L

[58] Field of Search .......... 358/4, 75, 127, 256, 358/296, 298; 346/1, 76 L

[56] References Cited

U.S. PATENT DOCUMENTS

| | | | |
|---|---|---|---|
| 3,396,401 | 8/1968 | Nonomura | 346/1 |
| 3,410,203 | 11/1968 | Fischbeck | 346/1 |
| 3,573,847 | 4/1971 | Sacerdoti | 346/76 L |
| 3,780,214 | 12/1973 | Bestenreimer et al. | 358/75 |
| 4,024,545 | 5/1977 | Dowling et al. | 346/76 L |

*Primary Examiner*—Richard Murray
*Attorney, Agent, or Firm*—Michael F. Petock

[57] ABSTRACT

Direct laser printing and forming apparatus is provided wherein a surface to be printed is coated with an ink which is setable upon being irradiated by energy. The surface to be printed may be selectively irradiated by a source of a directable beam of energy radiation or a coherent electromagnetic radiation, which may be a laser, which scans the surface to be printed. The image is formed directly on the surface by selectively irradiating portions of the ink to be set. The excess ink, which has not been set, is removed leaving the printed image. The coherent source of electromagnetic radiation or the laser is controlled by means of a computer system. The process may be repeated for different colors using a color separation technique. The apparatus may be used to print directly on large and/or irregularly shaped objects. In a second embodiment, the apparatus of the present invention may be used to form a three dimensional object from material which is setable upon being irradiated by electromagnetic radiation. The setable material may be a material which polymerizes upon being irradiated. In this embodiment, the beam of radiation is split into a plurality of beams which are caused to converge at a point and scan out a three dimensional object in a container of the setable material. This produces the three dimensional object.

24 Claims, 6 Drawing Figures

FIG. 5
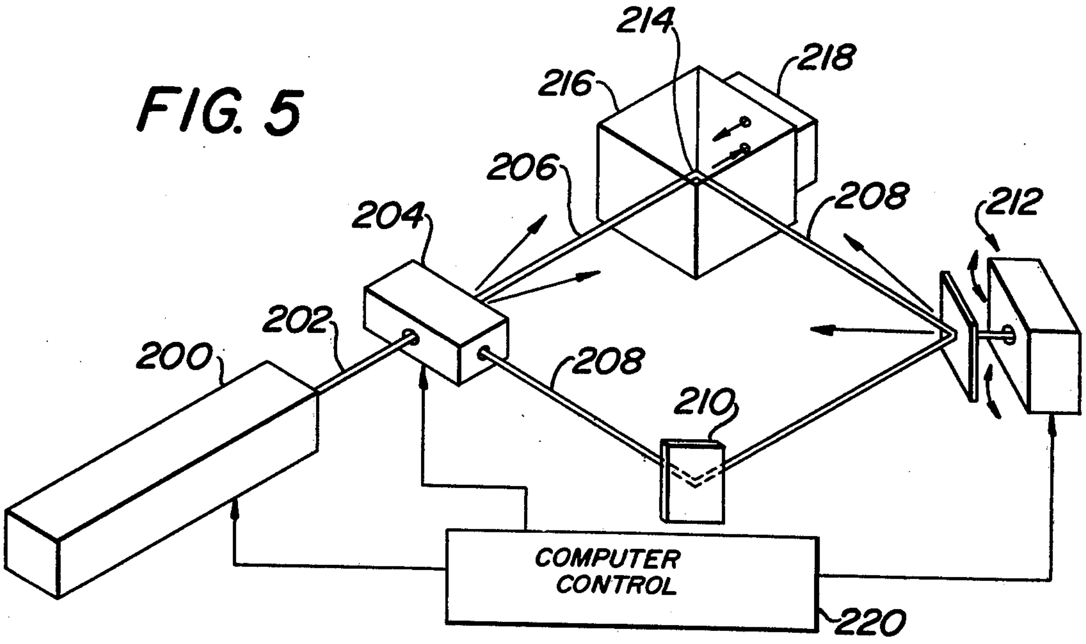
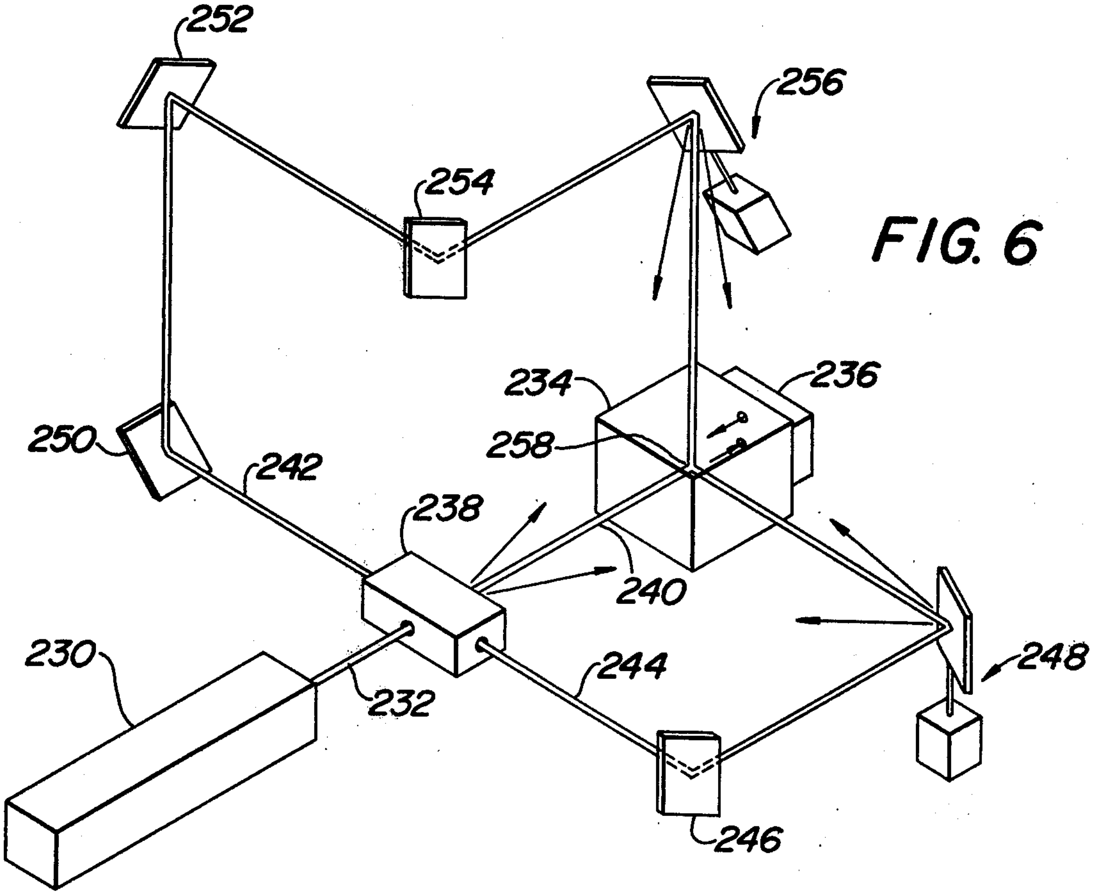
FIG. 6

DIRECT LASER PRINTING AND FORMING APPARATUS

BACKGROUND OF THE INVENTION

The present invention relates to a new and unobvious means of printing on a surface. The present invention is also directed to a new and unobvious means of forming three dimensional objects from a radiation setable material by means of a controlled scan of electromagnetic radiation or other suitable type of radiated energy such as a focusable electron beam.

In the past, printing was done primarily by means of printing plates or the silk-screen printing process. The processes of the past were directed to selectively applying ink and drying it whereas the present invention is directed to selectively curing, hardening or polymerizing a material to form a desired image or object. These prior art processes did not lend themselves to printing on large objects, such as the sides of buildings, tank trucks, billboards and other large or irregularly shaped objects.

Applicant has become aware of U.S. Pat. No. 3,410,203 which discloses a non-impact printer employing a laser beam and holographic images in which a toner material is fused to a web with the excess material being drawn from the web. There is no teaching in this patent of a setable type ink or polymerizable ink which may be set by means of a laser beam to print originals. Applicant has also become aware of U.S. Pat. No. 4,024,545-Dowling et al which discloses a laser apparatus which is used to burn alpha-numeric characters into cardboard boxes. However, no printing ink of any type is disclosed in this patent, nor is the creation of a three dimensional object disclosed. U.S. Pat. No. 3,780,214-Bestenreiner et al discloses a transfer process for making color prints on paper in which a laser scanning system is used to create a thermal image on a web which is then transferred to the paper. However, a direct laser printing process is not disclosed. There is no disclosure of producing three dimensional objects.

SUMMARY OF THE INVENTION

One advantage of the two dimensional imaging or printing system is that it may be used to print directly on large and/or irregular shaped objects, including but not limited to, tractor trailers; custom cars; motorcycles; buses; ships; airplanes; trains; dirigibles; houses; wall, ceiling and flooring materials; interior wall surfaces to form murals; glass windows and doors; the human body; billboards and sides of buildings.

An advantage of the three dimensional imaging system of the present invention is that it may be used to reproduce an object at a remote location quickly and accurately by the transmission of electrical signals.

Another advantage of the present invention is that it may be used to produce raised printing on large and/or irregularly shaped surfaces.

In accordance with the present invention, a material, which may be referred to as an ink in the two dimensional system, is used which sets, hardens, cures or polymerizes when irradiated with energy. The terms setable ink or setable material as used herein include materials which undergo a reaction in the form of polymerization, curing or hardening when irradiated by energy in the form of electromagnetic radiation, an electron beam or similar radiated energy. The energy radiation may be provided from a coherent source of electromagnetic radiation such as a laser. Alternatively, and in certain cases preferably, a focusable electron beam may be used as the radiated energy to set this ink or setable material. However, it is understood that the source of electromagnetic radiation may be operated in various frequency ranges which include but are not limited to infrared, visible light, ultraviolet and other wave lengths. The present invention is not directed to the mere mechanical fusing or melting of a material.

In accordance with the present invention, apparatus is provided for printing on a surface which may be large and/or irregularly shaped. Means is provided for storing information for forming an image by means of scanning. This information may be placed in the information storage means by scanning another image, may be transmitted from a remote location, or it may be created by means of a keyboard input with or without the use of further computer processing. A means is provided for applying ink to the surface to be printed. The means for applying ink may be any suitable means for providing a uniform coating such as a precision roller or an airless spray gun. The ink is setable in response to being irradiated by electromagnetic radiation. The source of energy radiation may be a source of coherent electromagnetic radiation, such as a laser. For purposes of description hereinafter, the source of energy radiation will be referred to as a source of coherent electromagnetic radiation or a laser without in any way limiting the type of suitable sources of energy radiation which may be used within the scope of the present invention. Means is provided for controlling the source of electromagnetic radiation in intensity and scanning in response to the information stored in the storage means. As the beam of electromagnetic radiation is scanned across the surface to be printed, an image is formed on the surface to be printed to form the desired image. Means is provided for removing from the surface ink which has not been set. This means for removing the ink may be a vacuum squeegee which may or may not include means for applying a solvent to aid in the removal of the ink which has not been set.

The apparatus of the present invention may be used for multicolor printing on a surface. Means are provided for storing information for forming images of at least first and second separate colors by means of scanning. This information which is stored relates to what are sometimes referred to as color separations in the art which may be produced by scanning an image through color filters. Alignment markers are formed on the surface to be printed either prior to the first color setting or after the first color setting but prior to the second color setting. The alignment markers may be manually placed or located by the laser. The markers may be printed markers either preprinted or printed by the laser at the site, or active or passive signaling devices that respond to irradiation. A setable ink of a first color is applied to the surface to be printed by applicator means, such as an airless spray gun or a precision roller. A source of energy radiation which may be a source of coherent electromagnetic radiation, such as a laser, is used to selectively irradiate the setable ink to form the image. Without being limiting, the source of energy radiation will be referred to as a laser or coherent source of electromagnetic radiation. It is understood that a controllable electron beam may be preferred in certain applications. The laser is controlled by a control means which controls the intensity and the scanning of the laser in response to the first color information stored in the information storage means. The ink of the first color which has not been set is removed by an ink removing means, such as a vacuum squeegee. The ink corresponding to the second color is applied to the surface by suitable applicator means. The alignment markers formed or positioned on the surface are detected and the laser or other source of coherent electromagnetic radiation is positioned for the second scan in accordance with the second color information stored in the information storage means. The second color image is set in exact registry with the first color image by the action of alignment of the laser with respect to the alignment marks. The second color ink which has not been set by the laser is removed from the surface by suitable removal means, such as a vacuum squeegee. The process may be repeated for additional colors if desired.

In the three dimensional object forming apparatus, a three dimensional object may be formed in response to the transmission of electrical signals from a remote location or by the generation of suitable electrical signals, such as by a computer program similar to the two dimensional system. The electrical control signals may be generated by scanning an object to be reproduced or by means of computer and/or human information inputs.

In the three dimensional object forming apparatus, a transparent container is provided which contains a quantity of material which is setable upon being irradiated by energy. A source of a directable beam of energy radiation which may be a source of coherent electromagnetic radiation is provided. However it is understood that any suitable source of energy radiation may be used such as a focusable electron beam or an energy beam having a Fourier distribution. However, without being limiting, the source of energy radiation will be referred to as electromagnetic radiation. This coherent electromagnetic radiation is of a predetermined intensity sufficient to set the setable material. The intensity of the coherent electromagnetic radiation is preferrably less than twice the minimum intensity required to set the material at a particular point in a predetermined period of time. Means is provided for splitting the beam of coherent electromagnetic radiation into a plurality of beams. Scan control means is provided for directing the plurality of beams to converge simultaneously at a point. This point of convergence is scanned sequentially through a plurality of points in the material to form a three dimensional object by means of causing the point of convergence to scan the entirety of a three dimensional object. After scanning is complete, any material which has not been set is removed thereby leaving the three dimensional object.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 5 is a schematic diagram of an apparatus in accordance with the present invention for forming three dimensional objects utilizing two beams of radiation.

FIG. 6 is a schematic diagram of an apparatus in accordance with the present invention for producing three dimensional objects utilizing three beams of coherent electromagnetic radiation.

DETAILED DESCRIPTION OF THE PREFERRED EMBODIMENTS

Figure 1:
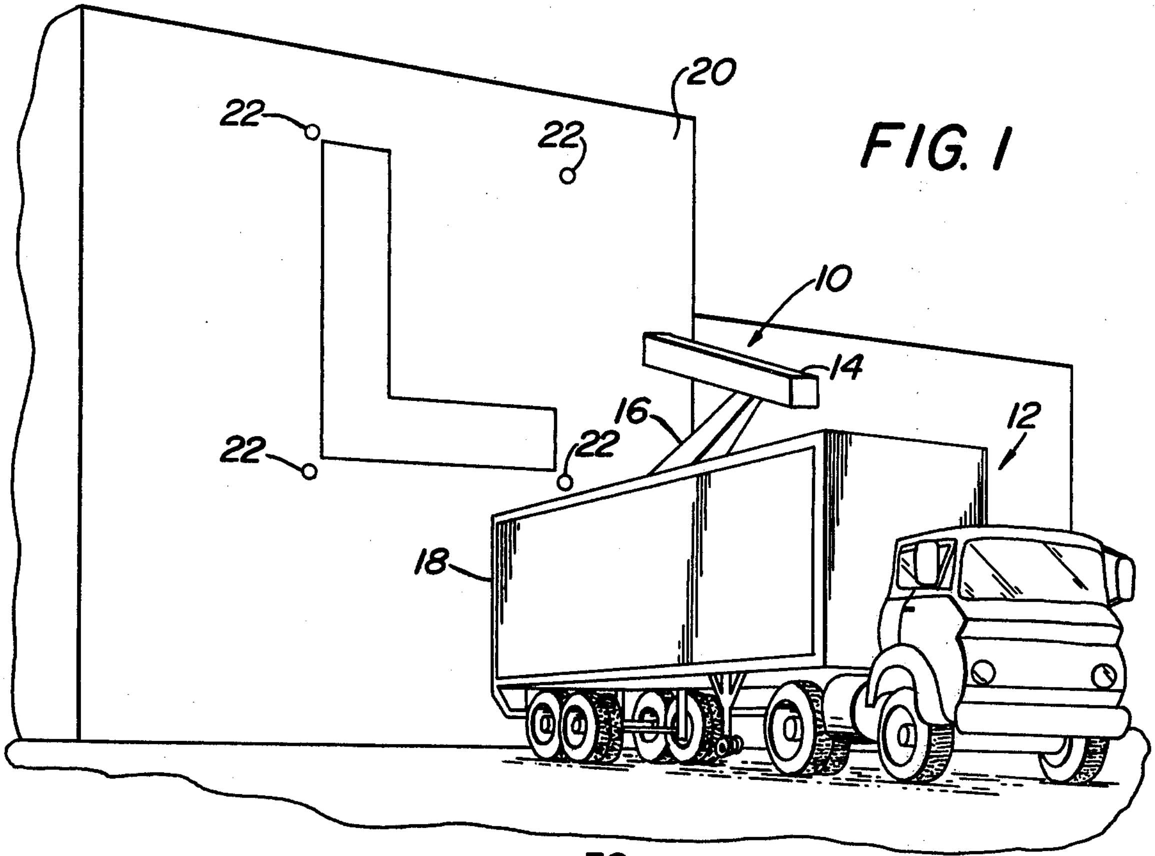
FIG. 1 is a view in perspective of a vehicle mounted direct laser printing apparatus in accordance with the present invention.

Referring now to the drawings in detail, there is shown in FIG. 1 a two dimensional printing apparatus 10 carried by a trailer truck 12. However, it is understood that any suitable vehicle may be used to transport the two dimensional printing apparatus to the desired locations. The two dimensional printing apparatus 10 is comprised of a scannable or directable energy radiation source which may be an electromagnetic radiation source, such as a laser, and scanning means contained in housing 14. Without being limiting, the terms coherent electromagnetic radiation source or laser will be used hereinafter. Housing 14 is mounted on a positionable boom 16. The electronics for controlling the laser in housing 14, ink supply means, ink removal means and other necessary equipment are contained in the trailer portion 18 of trailer truck 12.

In brief overview, on a surface 20 such as the side of a building to be printed, alignment markers 22 are placed or formed on the surface 20. The alignment markers 22 define the area which is to be printed. Preferrably, alignment markers 22 will be located at the four corners of a square or rectangle which defines the area to be printed with the markers being placed outside of the actual printing area. The alignment markers 22 may be placed on the surface in any suitable manner, such as painting, adhesively attached markers or other suitable means. The markers may be of any suitable shape and may include cross hairs for precision alignment. The alignment markers are used for both printing site definition and alignment of successive printings of separate colors. They may be detected by reflection or they may be sensors with connecting means to provide signal information to the electronics control system upon being irradiated. The markers may be active or passive sensors, light sources or any other suitable type of alignment marker.

After the tractor trailer or other suitable vehicle 12 is positioned in front of the surface 20 to be printed, a means for detecting the alignment markers 22 is energized. This detector means may preferrably comprise a separate detector laser and detector optics assembly mounted within the housing 14. The information obtained from detecting the position of the alignment markers 22, by angular position sensors (not shown) contained in the boom 16 control mechanism, is fed into a computer which determines various parameters for the scanning of the area to be printed. A setable ink material is then applied to surface 20 within the area defined by alignment markers 22. The printing laser mounted in housing 14 scans surface 20 within the area defined by markers 22. The scanning and intensity of the laser are controlled by information stored in the computer program, which will be described more fully hereinafter. It is understood that although lasers are referred to throughout the detailed description as the presently preferred embodiment, it is understood thay any suitable source of directable energy radiation may be used within the sphere and scope of the present invention. Although the two-dimensional printing apparatus is illustrated as producing a single color or multi color image on a large object from a distance (for example 20 to 30 feet), it is understood that the present invention may be used to print on any size surface, including smaller surfaces, and to print on the surfaces, such as panelling or sign boards, in an assembly line or conveyor type of arrangement from shorter distances. In such applications it may be preferrable to use a different type of energy radiation, such as a focusable electron beam.

The setable ink which was applied to surface 20 is scanned point by point by the laser. The intensity of the laser is varied over a complete range from on to off. Where the setable ink is scanned with the laser beam on, the ink is set at that point. The plurality of points set by the laser produce the desired image on surface 20. The terms "set" or "setting" include any type of ink or substance which polymerizes, hardens or cures upon being irradiated by electromagnetic radiation. Preferrably, the ink or setable material undergoes a chemical reaction such as polymerization and not fusing. By sequentially applying a plurality of coats which are each individually set by a separate scan of the laser, raised printing may be produced on the surface.

Figure 4:
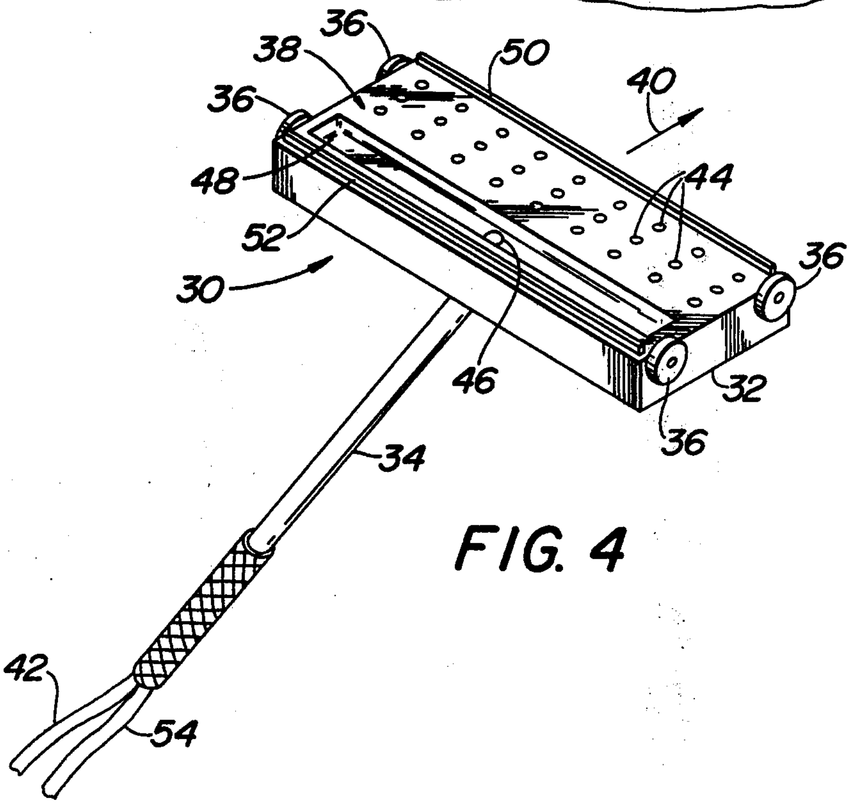
FIG. 4 is a vacuum type squeegee which includes a solvent applicator which may be used in accordance with the principles of the present invention for removing ink which has not been set.

After the setable ink at a plurality of points has been set by the laser scan in accordance with the information stored in the computer memory, the ink or material on surface 20 which has not been set is removed to leave the desired image. The ink which has not been set is removed by any suitable means including manually wiping or cleaning the surface. However, one preferred type of suitable means is shown in FIG. 4 which comprises a vacuum squeegee and a solvent applicator. Referring to FIG. 4, a suitable removal means is shown at 30. The removal means comprises a housing 32 mounted on a handle 34. Housing 32 is provided with a plurality of rollers 36 to aid the movement of face 38 of housing 32 over surface 20. Preferrably, face 38 is moved upwardly along surface 20 with the face 38 moving in the direction of arrow 40.

A suitable removal device may comprise a vacuum squeegee alone, or the vacuum squeegee device may be used in conjunction with a solvent applicator. The removal device illustrated in FIG. 4 combines a vacuum squeegee with a solvent applicator. The solvent is applied to the surface 20 through delivery hose 42 through handle 34, and out of a plurality of nozzles 44. The solvent and ink which has not been set is removed through vacuum port 46 which is provided with a vacuum trough 48. The face 38 of housing 32 is provided with shield or seal 50 and squeegee 52. The leading part 50 is very soft and flexible providing a seal or shield to prevent splashing of solvent from spray jets 44 and enhancing the vacuum action provided by vacuum port 46 and vacuum trough 48. Squeegee 52 is comprised of a firmer material than seal or shield 50 and provides the squeegee action in removing residual ink from surface 20. The ink which has been removed from surface 20, along with the solvent, is carried through vacuum trough 48, vacuum port 46, handle 34 and vacuum removal hose 54.

Figure 2:
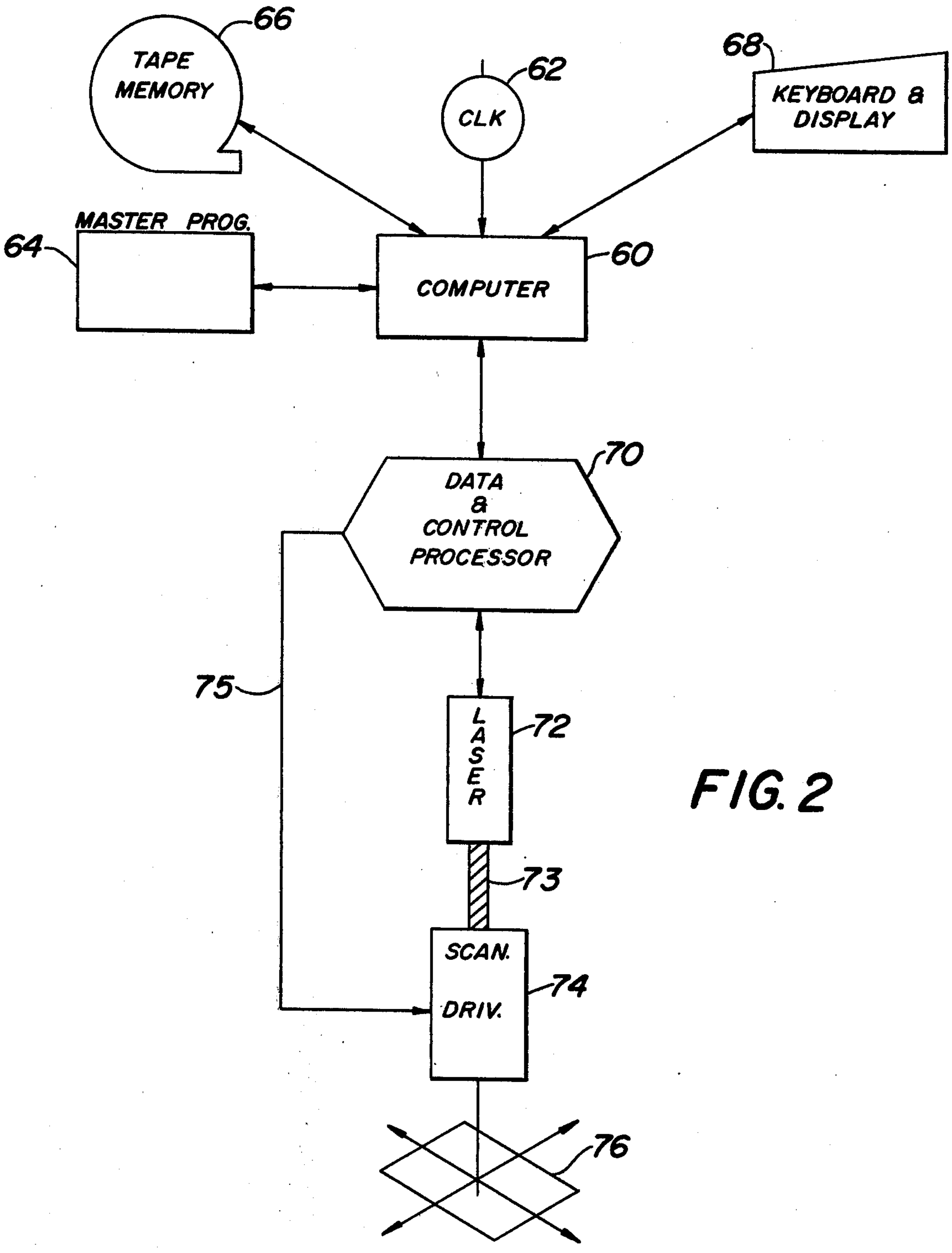
FIG. 2 is a schematic diagram in block diagram form of a scanning apparatus suitable for placing scan type image information into a computer memory means.

Referring now to FIG. 2, there is shown apparatus for generating the computer usable stored information for controlling the laser in the production of a printed image. There is shown in FIG. 2 a computer 60 which receives a clock input from clock circuitry 62. The computer 60 is capable of transferring information to and receiving information from master program memory 64, tape memory 66, keyboard and display unit 68 and data and control processor circuitry 70. Although memories 66 and 86 (FIGS. 2 and 3) will be referred to herein as tape memories, it is understood that any suitable type of memory may be used and may preferrably be a cassette type disk memory in some applications. These components are known to those skilled in the art. By way of example, but not by way of limitation, the computers 60 and 80 (FIGS. 2 and 3) may be a PDP model 11 computer, the keyboard and display unit 68 may be a model VT 52 Video Display Terminal, and the data and control processor 70 may be a model ICS Control Subsystem and model AD11-KT Data Acquisition Subsystem, all of which are manufactured by Digital Equipment Corporation and which are commercially available. Data and control processor 70 controls laser 72 and laser scan driver 74 under the control of computer 60 and the master program stored in master program memory 64. A platen 76 is provided on which an image or picture to be scanned is placed. In the scanning of a black and white picture for storage in memory 66 and subsequent reproduction, the print, picture or image is placed on platen 76. The operator initiates the scan through keyboard and display unit 68, which signals computer 60 to access master program memory 64. Under the control of the master program, computer 60 causes data and control processor 70 to turn on laser 72 which generates a laser beam 73 which is applied to laser scan driver 74. Data and control processor 70 controls laser scan driver 74 via connection 75. Laser unit 72 includes a sensor (not shown) which receives light information reflected from the point of scanning of the image on platen 76 being scanned. As scan driver unit 74 scans the laser beam across the image on platen 76, the sensor contained within the laser unit receives the optical information, which is converted into an electrical signal by the sensor, and the information is transmitted to data and control processor 70. Data and control processor 70 processes the data and transmits it to the computer 60, which stores the data on tape memory 66. At the end of the master program, a signal is transmitted from compouter 60 to data and control processor 70, which turns off laser 72, scan driver 74 and tape memory 66. The keyboard and display unit 68 is then signaled to indicate the end of the processing of image data into tape memory 66. The information on the tape, disk or other memory means may then be readily transferred to the electronics in trailer 18 for control to the printing process either by physically transferring the tape or by electronic signal transfer means such as radio transmission, combination on land line and radio transmission, or other suitable communication systems.

In placing information in tape memory 66 relating to printing in color, the apparatus of FIG. 2 may be operated in sequence on several color separation mechanicals placed on platen 76. In other words, a blue color separation mechanical may be placed on platen 76. After the laser scan is completed and the information relating to the blue color separation is stored in the tape memory 66, a red color separation may be placed on platen 76 and the process repeated. This may be carried out for the desired number of color separations. The blue and red color separations are given by way of example, and are not intended to be limiting. The making of color separation mechanicals or prints from colored images is well known in the art and equipment is commercially available for such purposes. The color separation data may be made directly from a multi color image placed on platen 76 by the use of appropriate color filters.

Figure 3:
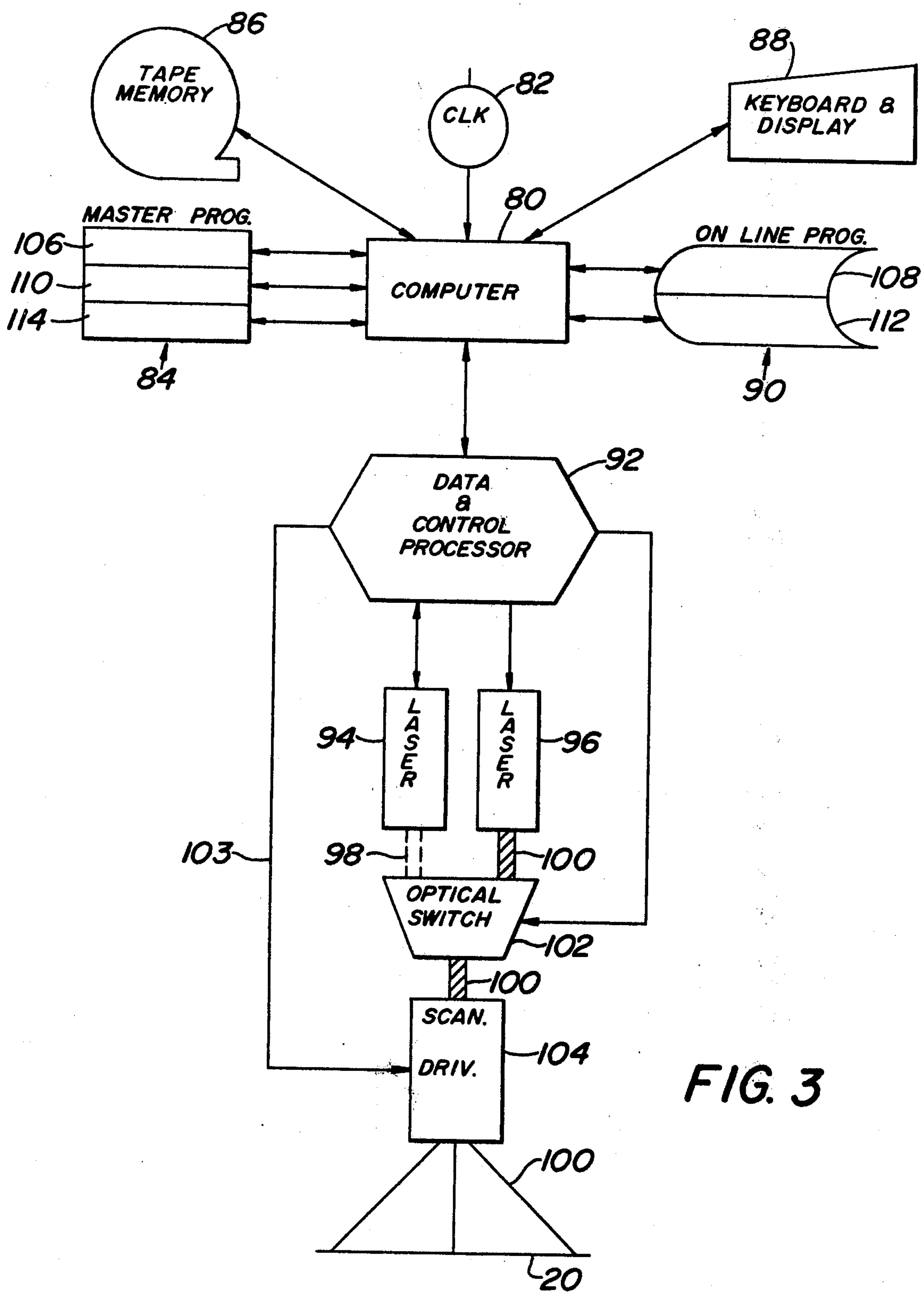
FIG. 3 is a schematic diagram in block diagram form of a direct laser printing apparatus in accordance with the present invention.

Referring now to FIG. 3, there is shown a schematic diagram in block diagram form, of the two dimensional printing apparatus 10 previously discussed in connection with FIG. 1. There is shown in FIG. 3 a computer 80 which receives a clock input from clock circuitry 82. Clock circuitry 82 may produce a clock output signal of substantially the same frequency as clock circuit 62 in FIG. 2. Computer 80 receives information from and transmits information to master program memory 84, tape memory 86, keyboard and display unit 88, online program storage memory 90 and data and control processor 92. By way of example, but not by way of limitation, computer 80 and data and control processor 92 may be of the type of equipment manufactured by Digital Equipment Corporation which was mentioned in connection with computer 60 and data and control processor 70, respectively.

Connected with data and control processor 92 are the laser units 94 and 96. Laser unit 94 preferrably includes a sensor which is not shown. However, in applications where the alignment markers 22 are sensors connected to or in communication with the electronics to provide a signal when irradiated, no sensor is necessary in laser unit 94. Laser unit 96 is provided with a modulator which forms a part of laster unit 96. Laser unit 94 receives information from data and control processor 92 and transmits information back to data and control processor 92. Laser unit 96 receives information from data and control processor 92 for the control and modulation of the laser beam 100. The laser beam 98 of laser unit 94, when turned on, and the laser beam 100 of laser unit 96, when turned on, are applied to optical switch 102. Optical switch 102 selects the beam which is applied to scan driver unit 104. Scan driver 104 deflects the laser beam across the surface 20 to be printed.

In operation, the tape generated in the apparatus of FIG. 2 in tape memory 66 is transferred to tape memory 86. The alignment markers 22, as shown in FIG. 1, are placed on the surface to be printed. The alignment markers 22 may be, but do not have to be retroflective. They may be sensors that are wired back to the system, or sensors which contain miniature transmitters to relay the information back to the system. However, it is understood that the present invention is not limited to any of these particular types of markers, but may be of any suitable type which serves the purpose within the spirit of the present invention.

The operator, after suitable positioning of housing 14 in FIG. 1 with respect to the surface 20 to be printed, initiates the process through keyboard and display unit 88. Keyboard and display unit 88 signals computer 80 to access master program memory unit 84, and particularly a scanning and set up program 106. The computer 80 in response to scanning and set up master program 106, via data and control processor 92, switches optical switch 102 to receive laser beam 98 from laser unit 94 and then turns on laser unit 94. Data and control processor 92 controls scan driver unit 104 causing the laser beam output of laser unit 94 to be scanned across the surface 20 to be printed, and particularly scans for the detection of alignment markers 22. The detection of alignment markers 22 is done preferrably by means of a sensor in laser unit 94. The information from the sensor in laser unit 94 is transmitted to data and control processor unit 92 for further transmission to computer 80, which causes the information to be stored in online program storage unit 90 at 108. At the end of the scanning and set up program 106, a signal is transmitted through computer 80 to data and control processor 92 which turns off laser unit 94 and scan driver 104. The keyboard and the display unit 88 is then signaled to indicate the end of the scanning operation.

The operator then initiates the generation of the print program through keyboard and display unit 88 by signaling computer 80 to access master program memory 84 for master print program generation program 110 to cause the computer to access the data in tape memory 86 and combine this data with the data stored in on-line storage memory 108 to formulate the print program. The formulated print program is stored in on-line storage unit 112. Assuming that it is desired to print a color image on surface 20, the operator then applies to surface 20 the color corresponding to the color information presently stored in storage 112. Application of the ink may be by a precision roller or by a spray device which applies an even coating of setable ink over the surface 20 to be printed. The spray device may preferrably be an airless spray gun.

Upon completion of the application of the setable ink or material to the surface 20, computer 80 initiates the actual printing process or setting of the ink by accessing a master print program 114 in master program memory 84. The computer 80, in accordance with the master print program 114, uses the data stored in on-line program memory 112 for control of data and control processor 92. Data and control processor 92, in response to this information, switches optical switch 102 to proper position for laser unit 96. Data and control processor 92 turns on laser unit 96 and controls scan driver 104 via connection 103. Data and control processor 92, provides data to simultaneously control the modulator of laser unit 96. The laser beam 100, as deflected by scan driver unit 104, scans the surface 20 to be printed while being simultaneously modulated in accordance with the print data. Upon the completion of the print data from on-line storage 112, a signal is transmitted from print program 114 through computer 80 to data and control processor 92 which turns off laser unit 96 and scan driver unit 104. Keyboard and display unit 88 is then signaled to indicate the end of the printing scan for that particular color.

The ink which has not been set during the scanning process is then removed as previously described in connection with FIGS. 1 and 4. The process may then be repeated for additional separate colors. The scanning process by laser unit 94 for subsequent colors detects the same alignment markers 22 thereby insuring that the subsequent separate color printing will be accomplished in exact registry with the image previously printed on surface 20. It is also within the present invention to produce raised printing on the surface 20 by repeatedly printing, coating and setting the setable material, with the same subject matter being printed, thereby building up the printed material to an extent where it is raised from the surface.

In accordance with the present invention, three dimensional objects may be formed. The forming of the three dimensional objects may be from information obtained by scanning a similar object at a remote or nearby location. Alternatively, the information for the formation of the object in accordance with the present invention may be computer generated from instructions, that is, not generated in response to the scanning of another object.

Generally, and in accordance with the present invention, a transparent container is provided for containing a quantity of material which is setable upon being irridiated by energy radiation. The source of energy radiation may be a source of coherent electromagnetic radiation such as a laser, preferrably operating in the ultra violet frequency spectrum. The energy radiation may preferrably be a focusable electron beam or Fourier distribution beams to reduce losses in passing through the material. However, without intending to limit the types of energy radiation which may be used in practicing the present invention, the invention will be described herein as utilizing a source of coherent electromagnetic radiation such as a laser. A computer system, similar to that used in the two dimensional system, with an expansion to accept information and controls relating to a third dimension may be utilized. The electromagnetic radiation used to set (polymerize, harden or cure) the setable material selectively to form the object is derived from a coherent beam of electromagnetic radiation, such as a laser beam, which is of sufficient intensity to set the material at the normal scanning rate, but is preferrably less than twice the minimum required intensity. The coherent electromagnetic radiation beam or laser beam is split into two or more beams which are deflected or directed to recombine at a point within the setable material. The recombination point is caused by the deflection means to scan the form of a three dimensional object. The point at which the beams recombine receives sufficient electromagnetic radiation to cause setting of the setable material. As the composite point is caused to scan the entirety of a three dimensional object, such three dimensional object is formed in the setable material. Upon completion of the scanning, any unset material is removed. In this manner complete and accurate reproduction of objects can be produced at a remote point in the setable material. In this manner, an object may be scanned in New York, the information electronically transmitted to the west coast with the object reproduced on the west coast by means of the present invention. The present invention may also be used to produce objects locally from various forms of computerized data. For example, the present invention may be used in conjunction with axial tomography in the medical field wherein the data is presently recorded and displayed on paper or a video display. This data may now be produced in the form of a three dimensional object. For example, the computerized axial tomography data of a patient's heart with a bad mitral valve may be produced in exact exterior and interior detail in a three dimensional object. Physicians and surgeons may then dissect the valve area and evaluate a prosthetic valve for fit within the area concerned. Similarly, various other volumetric measurements may now be computed simply with this system by the placing of fluids into the heart chanbers of a model produced in accordance with the present invention, and then measuring the quantity of the fluid removed from the object. This would provide accurate measurements of volumes which now can only be approximated because of the elaborate dimensions of the interior of each individual's heart. Costly anatomic models may be produced by the present invention inexpensively and in precise detail.

Referring now to FIGS. 5 and 6, the apparatus of a system for producing three dimensional objects in accordance with the present invention is shown in greater structural detail. Referring now particularly to FIG. 5, there is shown a source of electro-magnetic radiation 200 which may be in the form of a laser, and will be referred to herein as a laser. However, it is understood that other suitable sources of coherent electromagnetic radiation may be used in the present invention. The laser 200 produces a laser beam output 202 which is split in laser beam splitter and deflector means 204 into laser beams 206 and 208. The intensity of laser beam 202 is of sufficient magnitude to set the setable material upon being irradiated at the normal scan rate. The intensity of laser beam 202 is selected or adjusted so that the individual beams 206 and 208 are of insufficient intensity to set the setable material at the normal scan rate. However, when the plurality of beams are recombined at a single point within the setable material, setting does occur. In essence, the laser beam output of laser 200 is split into a plurality of beams, each of which is insufficient to cause the setting of the setable material at the normal scan rate, but which when recombined at a point cause a sufficient intensity of electromagnetic radiation at that point to set the setable material.

Laser beam 208 may be deflected by a fixed mirror or surface 210 to deflecting or scanning means 212. The deflection means or scanning means in laser beam splitter and deflector 204 and deflector means 212 cause the laser beams 206 and 208 to be recombined at a point within the setable material identified by number 214. The deflection means within laser beam splitter and deflector means 204 and deflector means 212 cause the recombination point 214 to be scanned throughout the material to form the object to be created.

The setable material is contained within a transparent container 216. The transparent container may be provided with a recirculation means 218. The recirculation means may be provided to prevent any possible setting of the material at undesired locations due to a single portion of the laser beam, such as split portion 206 or split portion 208 being scanned repeatedly through a particular point. The recirculation means may be operated intermittently between periods of scan of the laser beams to prevent any possible interference with the desired object formation.

Computer control circuitry 220 is indicated to provide the intensity control to laser 200, and the scanning or deflecting control signals to the deflector in laser beam splitter and deflector means 204 and deflector means 212. Both of the deflector means are capable of deflecting the laser beams in two orthogonal directions. The computer control circuitry may be similar in structure to that disclosed with respect to the two dimensional printing system described in connection with FIG. 3 with the addition of controls for the additional scanning in three dimensions.

Referring now to FIG. 6, there is shown another embodiment of an apparatus in accordance with the present invention for producing three dimensional objects in which the laser beam is split into three beams which are recombined at a point in the setable material by three scanners which may be referred to as the "X", "Y" and "Z" scanners. Referring to FIG. 6 there is shown a source of coherent electromagnetic radiation or a laser 230. The laser beam output 232 of laser 230 is of sufficient intensity to cause setting of the setable material contained in transparent container means 234. Transparent container means 234 may be similar to transparent container means 216 shown in FIG. 5. Transparent container means 234 is also provided with a recirculation means 236 which may be similar to recirculation means 218. The laser beam 232 is split into a plurality of beams, particularly three in the case of FIG. 6, by means of laser beam splitter and deflector means 238. However, it is understood that the laser beam may be split into more than three beams. In some circumstances, it may be preferable to split the laser beam into more than three beams in order to reduce the possibility of setting the setable material in container 234 at undesired locations. However, the splitting of the beam into a large number of beams has the disadvantage of requiring additional coordinated scanning equipment for each additional partial beam generated.

Continuing now with the description of FIG. 6, it may be seen that laser beam 232 is split into a plurality of laser beams 240, 242 and 244. Partial laser beam 240 is deflected by means of a scanner, which may be referred to as the "X" scanner in laser beam splitter and deflector means 238. The partial laser beam 244 is deflected by a fixed mirror 246 to a deflector or scanner 248 which may be referred to as the "Y" scanner. Partial laser beam 242 is deflected by fixed mirrors 250, 252 and 254 to a scanner means 256 which scans beam 242 in what may be referred to as the "Z" direction. In other words, the partial laser beams 240, 242 and 244 are scanned by means of the three scanner means in three orthogonal directions, which are often conventionally referred to as the X, Y and Z directions and recombined at a point within the setable material. This point is illustrated in FIG. 6 as 258. The intensity of the radiation at the recombination point of the three partial laser beams is sufficient to cause setting of the setable material. As this point is scanned through the material, a three dimensional object is formed. Laser means 230 receives a modulation input and scanner means 248 and 256 and the scanner means contained within unit 238 receive scan control signals from a computer control means (not shown) which may be similar to that shown in FIG. 5, but provided with means for controlling three orthogonal laser beam scanners.

It is understood that more than three partial beams may be used with the advantage that the intensity of each partial or split beam is a smaller percentage of the minimum material setting intensity. This would further reduce any possibility of undesired setting of material caused by repeated scanning of a single partial beam through a particular point in the material.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for printing on a surface, comprising:
- means for applying a polymerizable ink to the surface to be printed, said ink polymerizing in response to energy radiation;
- a source of a directable beam of energy radiation;
- means for controlling the source of radiation in intensity and scanning in response to electrical signal information whereby the energy radiation may polymerized the ink at a plurality of points on the surface to form a printed image; and
- means for removing from the surface ink which has not been polymerized.

2. Apparatus in accordance with claim 1 wherein said source of radiation is vehicle mounted.

3. Apparatus in accordance with claim 2 wherein said source of radiation is mounted on a boom on said vehicle.

4. Apparatus in accordance with claim 1 wherein said source of a directable beam of energy radiation is a source of coherent electromagnetic radiation.

5. Apparatus in accordance with claim 4 wherein said coherent source of electromagnetic radiation is comprised of a laser.

6. Apparatus in accordance with claim 1 wherein said source of a directable beam of energy radiation is comprised of an apparatus for producing a focusable electron beam.

7. Apparatus in accordance with claim 1 including means for storing information for forming an image by scanning.

8. Apparatus in accordance with claim 1 including means for receiving information from a remote location for forming an image by scanning.

9. Apparatus for multi-color printing on a surface, comprising:
- means for processing information for forming images of at least a first and a second separate colors by scanning;
- means for applying a setable ink of a first color to the surface to be printed;
- a source of a directable beam of energy radiation;
- means for detecting alignment markers positioned on the surface for positioning and controlling the scan of said source of energy radiation;
- means for controlling the source of energy radiation in intensity and scanning in response to the first color information whereby the energy radiation may set ink at a plurality of points on said surface to form a desired image of a first color;
- means for removing ink of said first color from said surface which has not been set;
- means for applying a setable ink of a second color to said surface to be printed;
- means for detecting said alignment markers on the surface and positioning said source of energy radiation prior to a second scan of said surface whereby said source of energy radiation is controlled by said control means in response to the second color information to print a second color image in exact registry with said first color image; and
- means for removing ink of said second color from said surface which has not been set.

10. Apparatus in accordance with claim 9 wherein said source of radiation is vehicle mounted.

11. Apparatus in accordance with claim 9 wherein said source of radiation is mounted on a boom on said vehicle.

12. Apparatus in accordance with claim 9 wherein said source of energy radiation is a source of coherent electromagnetic radiation.

13. Apparatus in accordance with claim 12 wherein said source of electromagnetic radiation is comprised of a laser.

14. Apparatus in accordance with claim 9 wherein said source of energy radiation is comprised of an apparatus for producing a focusable electron beam.

15. Apparatus in accordance with claim 9 wherein said setable ink is comprised of an ink which cures when irradiated with electromagnetic radiation.

16. Apparatus in accordance with claim 9 wherein said setable ink is comprised of an ink which polymerizes when irradiated with electromagnetic radiation.

17. Apparatus in accordance with claim 9 including means for storing information for forming an image by scanning, said processing means receiving information from said storage means.

18. Apparatus in accordance with claim 9 including means for receiving information from a remote location for forming an image by scanning, said processing means receiving information from said receiving means.

19. A method for printing on a surface, comprising:

applying an energy radiation polymerizable ink to the surface to be printed;

providing a source of a directable beam of energy radiation for irradiating said polymerizable ink;

controlling the source of energy radiation in intensity and scanning in response to electrical signal information whereby the energy radiation may polymerize the ink at a plurality of points on the surface to form a printed image; and removing from the surface ink which has not been polymerized.

20. A method in accordance with claim 19 including the step of storing information for forming the image by scanning.

21. A method in accordance with claim 19 including the step of receiving information from a remote location for forming the image by scanning.

22. A method for multi-color printing on a surface, comprising:

applying an energy radiation setable ink of a first color to the surface to be printed;

providing a source of a directable beam of energy radiation for irradiating said ink on the surface;

detecting alignment markers positioned on the surface for positioning and controlling the scan of said source of energy radiation;

controlling the source of energy radiation in intensity and scanning in response to the first color signal information whereby the energy radiation may set ink at a plurality of points on the surface to form a desired image of a first color;

removing ink of said first color from said surface which has not been set;

applying an energy radiation setable ink of a second color to the surface to be printed;

detecting said alingment markers on the surface and positioning said source of energy radiation prior to a second scan of said surface whereby said source of energy radiation is controlled by said control means in response to the second color information to print a second color image in exact registry with said first color image; and removing ink of said second color from said surface which has not been set.

23. A method in accordance with claim 22 including the step of storing information for producing said first and second separate color images by scanning.

24. A method in accordance with claim 22 including the step of receiving information for forming an image of said first and second colors from a remote location.

* * * * *